3,075,853
PRESSURE SENSITIVE ADHESIVE TAPE
Albert M. Striker, Cohoes, and Charles S. Webber, Loudonville, N.Y., assignors to Norton Company, Troy, N.Y., a corporation of Massachusetts
Filed Aug. 8, 1960, Ser. No. 47,899
2 Claims. (Cl. 117—33.5)

The present invention relates in general to pressure-sensitive adhesive tapes and more particularly to transparent, plastic film-backed tapes.

The manufacture of transparent, film-backed pressure-sensitive tapes has developed over a period of some thirty years and the components of such tapes are generally quite similar to the components used in the manufacture of non-transparent tapes, i.e. to one side of the backing member is applied a release coat or backsize, and to the other side a primer or tie coat and a pressure-sensitive adhesive layer or mass coat.

However, in the case of transparent tapes, care must be taken to avoid using materials which are in themselves colored or which will discolor upon exposure to natural or artificial light. Despite the long history of the development of those products and the intensive research on the various components of such transparent tapes, it is still essentially impossible to produce a combined structure wherein some trace of discoloration is not present. Moreover, the fact that tapes of this kind are almost universally sold in roll form with one convolution superimposed upon another compounds the discoloration effect. Efforts to overcome this problem have included the development of purer compounds for use in formulating the various components of the tapes and even the use of white cores to attempt to counteract the cumulative discoloration effect of the plurality of layers of tape in the conventional rolls. None of these efforts have been completely satisfactory and the problem still exists in the transparent tape industry.

Accordingly, it is an object of the present invention to provide an improved transparent film-backed, pressure-sensitive adhesive tape.

Another object of the invention is to provide such a tape in roll form having improved properties of transparency.

A further object is the provision of a transparent film-backed, pressure-sensitive adhesive tape having improved transparency at the time of manufacture and which is capable of retaining these improved properties even upon exposure to natural or artificial light.

Figure 1:
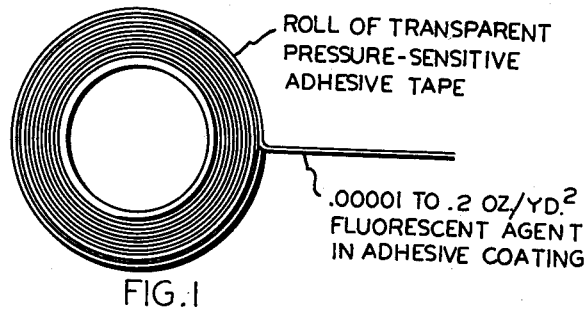
Figure 2:
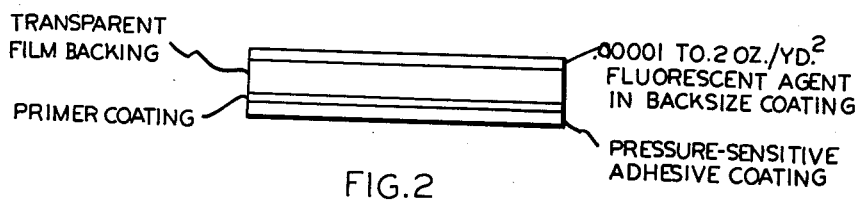
Figure 3:
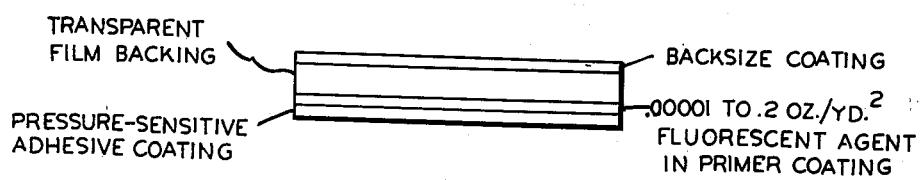
Figure 4:
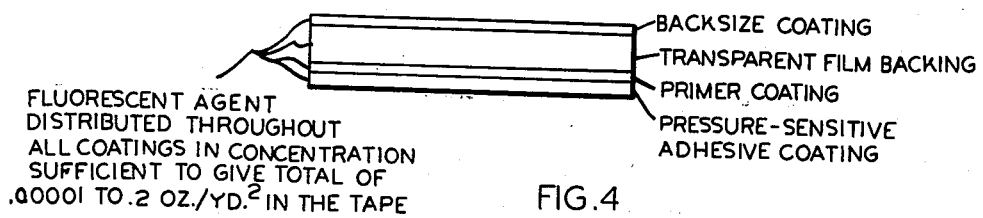

Additional objects, if not specifically pointed out herein, will be readily apparent to one skilled in the art from the following detailed description of the invention:

In the drawings:
FIGURE 1 is a plan view of a roll of pressure-sensitive adhesive tape embodying one aspect of the present invention.
FIGURE 2 is a schematic cross-section of a piece of tape showing a modification of the present invention.
FIGURE 3 is a schematic cross-section of a tape showing a further modification of this invention.
FIGURE 4 is a schematic cross-section of a tape showing a still further modification of the invention.

Generally, the present invention relates to transparent film-backed, pressure-sensitive adhesive tapes wherein a small amount of a particular class of materials is added to one or more of the coatings applied during the manufacture of such tapes to enhance the transparency of the finished tape and to assist in preventing subsequent discoloration due to the action of ultraviolet light on the rubber and resin components of the tapes.

More specifically, it has now been found that transparent tapes may be substantially improved in both initial appearance and in their ability to remain transparent and colorless to visual inspection by the incorporation in at least one of the coatings applied to the transparent film backing of a small amount of a compound which absorbs light in the range of 2800–4000 A., and re-emits light in the range of 4400–5125 A., and which is soluble in water or dispersible in organic solvents to the extent of at least 0.001%.

As opposed to prior art usage of fluorescent materials in tape, only very minor amounts of these agents are incorporated in the tapes of the present invention. Generally, it has been found that the concentration of fluorescent material in the coatings should range from about 0.00001 oz./square yard to about 0.2 oz./square yard.

In the present application, products of this character are introduced into the solvated coating materials where they absorb the near ultraviolet light and remit the same as violet, blue or blue green, diluting the natural internal yellow cast of the polymeric coating products. Thus water white products with little or no trace of color in the visual spectrum are produced.

The materials falling into the usable class for this application require that the adjuvant must of necessity be compatible with the rubbers, resins, polymers and solvents employed. If they are not compatible the fluorescent compound will coagulate and settle out of the coating before or after application on the transparent film backing producting an unsightly, cloudy or hazy product of no commercial value. The fluorescent product required must also be free of chemical groupings that will interact adversely with the other ingredients and thereby detract from the physical properties on aging such as clarity, water whiteness, adhesion, elasticity, cohesiveness, tack and quickstick. As is well known in the art very minute amounts of certain metals and their oxides and salts and other products cause rapid depolymerization and degradation of rubber compositions as well as other materials that promote oxidation. Fluorescent materials of this type hence are excluded from the scope of the present invention.

Luminescent tapes have heretofore been produced for use as marking tapes and hence have contained very substantial amounts of the particular compound used to produce the luminescence. Such tapes obviously bear little relationship to the present tapes wherein a very minor amount of a fluorescent material having specific properties is employed. Likewise, not to be confused with the present invention is the practice of incorporating pigments to impart color to the finished tape.

The compounds found to be useful in the present invention and to come within the definition of useful fluorescent materials set forth above are those selected from the group consisting of anthracene, carbazole, chrysene, acridine, quinoline, fluorene, bi-phenyl, ter-phenyl, perylene, xanthone, phenanthrene, umbelliferone, dibenzanthracene, coumarin, anthranthrene, stilbene, substituted naphthalene and derivatives thereof which fall within the limitations as set forth above. Commercially available trade products include Paper White BP (CI Fl. Br. Ag.[1] 28), Fluorescent Purple RB (CI Fl. Br. Ag. 27), Tinopol 4 BM (CI Fl. Br. Ag. 22), Uvitex P (CI Fl. Br. Ag. 29), Uvitex U (CI Fl. Br. Ag. 39), Uvitex NL (CI Fl. Br. Ag. 62), Calcofluor White RW (CI Fl. Br. Ag. 10) and others.

The fluorescent material may, in the present invention, be incorporated in either the backsize, primer or mass of the pressure-sensitive adhesive tape or in each of the polymeric coatings simultaneously. FIGURE 1 of the drawings shows the fluorescent agent in the adhesive only; FIGURE 2 shows it in the backsize only; FIGURE 3 illustrates the use of the fluorescent agent in the primer only; and FIGURE 4 shows the distribution of the fluorescent material throughout all coatings. Many variations may be made in the type of component coatings, e.g. the backsize coating may be based on an alkyd, urea-formaldehyde, melamine formaldehyde, phenol-formaldehyde, epoxyline resin, polyacrylate, cellulose ester and ether or combinations of two or more of these with or without compatible release agents. Primers which may be used include those based on an aqueous or non-aqueous solvent media such as hydrophylic glutinous materials in admixtures with latices of hydrophobic elastomers and on solvated elastomers with or without diisocyanates or alkyl titanites as disclosed in U.S. 2,177,627, 2,236,567, 2,328,057, 2,328,066, 2,886,467, and 2,912,348. Pressure-sensitive adhesive masses which may be used include polyacrylates, polyvinyl ethers, castor oil ester, polyurethanes, natural and synthetic rubber base materials and combinations thereof with tackifying resins, curing resins, accelerators, antioxidants, reinforcing agents, fillers, etc. as illustrated in U.S. 2,177,627, 2,156,380, 2,328,057, 2,340,298, and 2,926,105. The only additional limitations on the component coatings used in the tapes of the present inventoin is that they are essentially colorless and transparent in nature.

Many of the commercially available fluorescent agents falling within the limits of those operable in the present invention are weighted with fillers such as Glauber's salt, sodium chloride, etc. which should be removed before adding to an adhesive, backsize or primer coating. The fluorescent agent is therefore dissolved in an organic solvent which is a nonsolvent for the weighting agent, i.e. toluene, anhydrous methanol, acetone, etc., and filtered. The filtered solution may be added directly to the adhesive, primer or backsize coating.

Where an aqueous media is employed, as in some primer compositions, the brightening agent may be water dispersed. However, care must be taken to remove salts where latices are used to avoid coagulation.

The following examples are illustrative only of coatings incorporating fluorescent materials in accordance with the present invention, and no limitation is intended other than appears in the appended claims:

*Example I*

1% Calcofluor White RW (Calco Chemical Co.) was dissolved in toluene and filtered to remove insolubles. The resulting solution was then added to a solvated pressure-sensitive adhesive mass to give a fluorescent agent concentration at a coating weight of 2.0 oz. per square yard of 0.034 oz. per square yard. The rubber-resin mass used was as follows:

| | Parts by weight |
|---|---|
| Milled pale crepe | 100 |
| Ester of hydrogenated rosin | 50 |
| Polybetapinene resin | 16 |
| Antioxidant | 2 |
| Petroleum oil | 20 |
| Calcofluor White RW | 3.2 |

[1] Color Index fluorescent brightening agent.

The finished tape exhibited the desired water-white effect.

*Example II*

An aqueous solution of Paper White BPN at 10% was added to the following primer to give a concentration of 0.0024 oz. per square yard when coated on a cellophane backing. The coating weight of the primer was 0.06 oz. per square yard.

| | Parts by weight | |
|---|---|---|
| 10% Paper White BPN | 8.0 | |
| 10% polyvinyl alcohol | 65.0 | 14% solids |
| 27% GR–S latex | 50.0 | |
| Water | 27.5 | |

Tape made with this primer on transparent cellophane with a transparent mass and backsize exhibited the desired appearance—especially upon exposure to light for a period of days.

*Example III*

A 1% solution of Calcofluor White WS in toluene was prepared as in Example I and added to the backsize to give a total concentration based on the solids of 1% to 50% as required. Due to the low coating weight of backsize employed (about 0.01 oz./yard square), this resulted in the present case in a concentration of fluorescent material of about 0.0001 oz. per square yard in the finished tape. The backsize composition used was 1% Kyrax A in toluene. (Kyrax is a polyvinyl stearate produced by Air Reduction Co.) Again, tape made with this backsize exhibited the desired transparency and whiteness.

*Example IV*

The backsize, primer and mass given in Examples I, II and III were combined on a single sheet of cellophane, to produce a combined effect. The resultant product was then wound in convolutions on a core to yield an essentially water white product.

The only limitation on the film employed as the backing is that it be transparent, relatively colorless and of sufficient strength to function as a tape backing. Well-known materials of this type include cellulosic films of regenerated cellulose, cellulose esters (cellulose acetate, cellulose nitrate, etc.), cellulose ethers (ethyl cellulose), films of rubber hydrochloride, synthetic resins, polyesters, chlorinated rubber, etc.

We claim:
1. A transparent, colorless pressure-sensitive adhesive tape comprising: the combination of a transparent film backing member and a plurality of transparent polymeric coatings uniformly distributed thereon including at least one coating of a transparent pressure-sensitive adhesive, said combination having a yellowish cast thereto, and at least one of said coatings containing uniformly distributed therethrough a small amount of a fluorescent agent selected from the group consisting of anthracene, carbazole, chrysene, acridine, quinoline, fluorene, bi-phenyl, ter-phenyl, perylene, xanthone, phenanthrene, umbelliferone, dibenzanthracene, coumarin, anthranthrene, stilbene, substituted naphthalene and derivatives thereof, which fluorescent agent is dispersible in organic solvents to the extent of at least 0.001%, and when in said coating absorbs light in the range of 2800 A. to 4000 A. and re-emits light in the range of 4400 A. to 5125 A. to substantially neutralize said yellowish cast of said combination.

2. A transparent, colorless pressure-sensitive adhesive tape comprising: the combination of a transparent film backing member and a plurality of associated transparent polymeric coatings uniformly distributed thereon, at least one of said coatings comprising a transparent pressure-sensitive adhesive, said combination having a yellowish cast thereto, and wherein at least one of said coatings contains a uniformly distributed small amount up to about 0.2 ounces per square yard of a fluorescent agent selected from the group consisting of anthracene, carbazole, chrysene, acridine, quinoline, fluorene, bi-phenyl, ter-phenyl, perylene, xanthone, phenanthrene, umbelliferone, dibenzanthracene, coumarin, anthranthrene, stilbene, substituted naphthalene and derivatives thereof, which fluorescent agent is dispersible in organic solvents to the extent of at least 0.001%, and when in said coating absorbs light in the range of 2800 A. to 4800 A. and re-emits light in the range of 4400 A. to 5125 A. to substantially neutralize said yellowish cast of said combination.

References Cited in the file of this patent

UNITED STATES PATENTS

| | | |
|---|---|---|
| 2,183,330 | Drew | Dec. 12, 1939 |
| 2,668,777 | Gold et al. | Feb. 9, 1954 |

OTHER REFERENCES

Hodgman: Handbook of Chemistry and Physics, page 2203, 28th ed. 1944, Chemical Rubber, Cleveland.

Pringsheim: Fluorescence and Phosphorescence, page 414, Interscience, New York, 1949.